United States Patent
Yamada et al.

(10) Patent No.: US 12,242,125 B2
(45) Date of Patent: Mar. 4, 2025

(54) OPTICAL CABLE LAYING METHOD

(71) Applicant: NIPPON TELEGRAPH AND TELEPHONE CORPORATION, Tokyo (JP)

(72) Inventors: Yusuke Yamada, Musashino (JP); Akira Sakurai, Musashino (JP); Yuta Maruo, Musashino (JP); Shigekatsu Tetsutani, Musashino (JP); Hisashi Izumita, Musashino (JP); Hiroaki Tanioka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 216 days.

(21) Appl. No.: 17/798,125

(22) PCT Filed: Mar. 2, 2020

(86) PCT No.: PCT/JP2020/008749
§ 371 (c)(1),
(2) Date: Aug. 8, 2022

(87) PCT Pub. No.: WO2021/176534
PCT Pub. Date: Sep. 10, 2021

(65) Prior Publication Data
US 2023/0073123 A1    Mar. 9, 2023

(51) Int. Cl.
*B29C 65/56* (2006.01)
*B29C 65/48* (2006.01)
(Continued)

(52) U.S. Cl.
CPC .............. *G02B 6/504* (2013.01); *B29C 65/48* (2013.01); *B29C 65/565* (2013.01);
(Continued)

(58) Field of Classification Search
CPC ..... B29C 48/0022; B29C 65/48; B29C 65/56; B29C 65/565; B29C 2793/0009; B29C 2793/0018; B29C 2793/0036; B29C 2793/0054; B29C 2793/0063; F16L 3/08; F16L 3/12; F16L 3/1226; F16L 3/123; F16L 3/1236; F16L 3/137; G02B 6/44;
(Continued)

(56) References Cited

U.S. PATENT DOCUMENTS

| 8,842,960 B2 * | 9/2014 | Berglund | G02B 6/4459 385/136 |
| 2009/0294016 A1* | 12/2009 | Sayres | B29C 48/12 156/196 |
| 2014/0153890 A1 | 6/2014 | Sayres et al. | |

FOREIGN PATENT DOCUMENTS

| JP | 2000137120 A | 5/2000 |
| JP | 2017-198900 A | 11/2017 |

OTHER PUBLICATIONS

Riley Freeland et al., "Strain Sensing of an In-Road FTTH Field Trial and Implications for Network Reliability", Proc. of IWCS (2019), Month of Publication Unknown.

* cited by examiner

*Primary Examiner* — Michael A Tolin

(57) ABSTRACT

A method of laying an optical cable according to the present disclosure includes: installing a laying strip, in which the optical cable is to be embedded, on a road surface or a wall surface; forming a cut line, for embedding the optical cable, on the installed laying strip; and embedding the optical cable in the formed cut line.

6 Claims, 9 Drawing Sheets

(51) Int. Cl.
    *G02B 6/44*           (2006.01)
    *G02B 6/50*           (2006.01)
    *H02G 3/04*           (2006.01)
    *H02G 9/02*           (2006.01)

(52) U.S. Cl.
    CPC ......... *G02B 6/4431* (2023.05); *G02B 6/4446* (2013.01); *H02G 3/045* (2013.01); *H02G 9/025* (2013.01); *B29C 2793/0036* (2013.01); *B29C 2793/0054* (2013.01); *B29C 2793/0063* (2013.01)

(58) Field of Classification Search
    CPC .... G02B 6/4401; G02B 6/4429; G02B 6/443; G02B 6/4431; G02B 6/4439; G02B 6/444; G02B 6/4441; G02B 6/4446; G02B 6/4459; G02B 6/4472; G02B 6/4475; G02B 6/46; G02B 6/47; G02B 6/475; G02B 6/4478; G02B 6/50; G02B 6/504; H02G 1/06; H02G 3/00; H02G 3/02; H02G 3/04; H02G 3/0437; H02G 3/045; H02G 3/263; H02G 3/266; H02G 3/30; H02G 3/305; H02G 3/32; H02G 3/34; H02G 9/00; H02G 9/02; H02G 9/025; H02G 9/04

See application file for complete search history.

OPTICAL CABLE LAYING METHOD

CROSS-REFERENCE TO RELATED APPLICATIONS

This application is a 371 U.S. National Phase of International Application No. PCT/JP2020/008749, filed on Mar. 2, 2020. The entire disclosure of the above application is incorporated herein by reference.

TECHNICAL FIELD

The present disclosure relates to a method of laying an optical cable.

BACKGROUND ART

Optical cables are used as transmission media for information communications. When the optical cables are laid outdoors, for example, an overhead wiring technology or an underground wiring technology is used. The overhead wiring technology is a wiring technology in which utility poles are built in advance on the ground and the optical cables are installed on the utility poles. The underground wiring technology is a wiring technology in which pipelines are buried underground in advance and the optical cables are laid in the pipelines.

Up to now, for lying new optical cables, the optical cables have been additionally laid in the area where metallic cables for communication have been already laid in most cases. In this case, since fundamental equipment such as utility poles and pipelines has already been built, the optical cables can be economically laid without new civil engineering works. The reason is that the location where communication demand arises is similar to the location where the existing metallic cables have been wired, and thus the optical cables can be additionally laid without constructing new fundamental equipment.

To widely deploy, for example, antennas for mobile phones, the need to lay optical fibers has recently arisen even in areas where fundamental equipment has not been built. Even when fundamental equipment has been built, the need to provide new wiring arises on structures such as road lamps on roads instead of houses and buildings. These cases involve large investment to build additional fundamental equipment. For economical wiring of the optical cables, it is desirable to lay the optical cables without civil engineering works as much as possible.

To simplify civil engineering works, an optical cable that can be directly buried without using a pipeline has been proposed (see Patent Literature 1, for example). Alternatively, a method of laying an optical cable has also been proposed in which a groove is provided in a paved road surface and the optical cable is laid in the groove (see Non-Patent Literature 1, for example).

CITATION LIST

Patent Literature

Patent Literature 1: Japanese Patent Laid-Open No. 2017-198900

Non-Patent Literature

Non-Patent Literature 1: Strain Sensing of an In-Road FTTH Field Trial and Implications for Network Reliability, Proc. of IWCS (2019)

SUMMARY OF THE INVENTION

Technical Problem

Unfortunately, although eliminating the need for burying pipelines or building utility poles, these methods involve digging up the ground for a length long enough to lay the optical cables or excavating the road surfaces paved with asphalt or concrete. Such civil engineering works are difficult to be performed by man power, and are large-scale ones such that heavy machinery is used.

When the optical cables are wired, connection units need to be provided for extending or branching the optical cables. Such connection units are generally accommodated in housings such as closures. When optical cables are laid according to the above-mentioned prior art, certain spaces for housing these closures need to be secured. Furthermore, when the optical cables are pulled up from the underground to the ground, spaces for protecting pull-up ports are required. These spaces must be prepared before the optical cables are laid.

The optical cables to be laid later need to have extra-length portions for future connection and branching. To protect the extra-length portions of the optical cables, boxes for accommodating the extra-length portions need to be provided. Since being installed on the ground, the box may be an obstructive factor for road traffic.

To ensure stable communication, the optical cables need to be laid in stable places. Furthermore, when being no longer needed, the optical cables are desirably removed without civil engineering works, as in installation.

Means for Solving the Problem

The present disclosure is intended to solve the above-mentioned problems, and it is an object of the present disclosure to provide a method of laying an optical cable that is capable of laying and removing the optical cable in a stable place without civil engineering works.

In the present disclosure, to eliminate the need for civil engineering works, the optical cable is embedded in a laying strip that is installed on a road surface or a wall surface and that has a cut line formed therein for embedding the optical cable.

Specifically, a method of laying an optical cable according to the present disclosure includes:

installing a laying strip, in which the optical cable is to be embedded, on a road surface or a wall surface;

forming a cut line, for embedding the optical cable, on the installed laying strip; and embedding the optical cable in the formed cut line.

Specifically, a method of laying an optical cable according to the present disclosure includes:

installing a laying strip, on which a cut line for embedding the optical cable is formed in advance, on a road surface or a wall surface; and embedding the optical cable in the cut line on the installed laying strip.

Effects of the Invention

According to the method of laying the optical cable of the present embodiment, it is possible to provide a method of laying an optical cable that is capable of laying and removing the optical cable in a stable place without civil engineering works.

DESCRIPTION OF EMBODIMENTS

Figure 1:
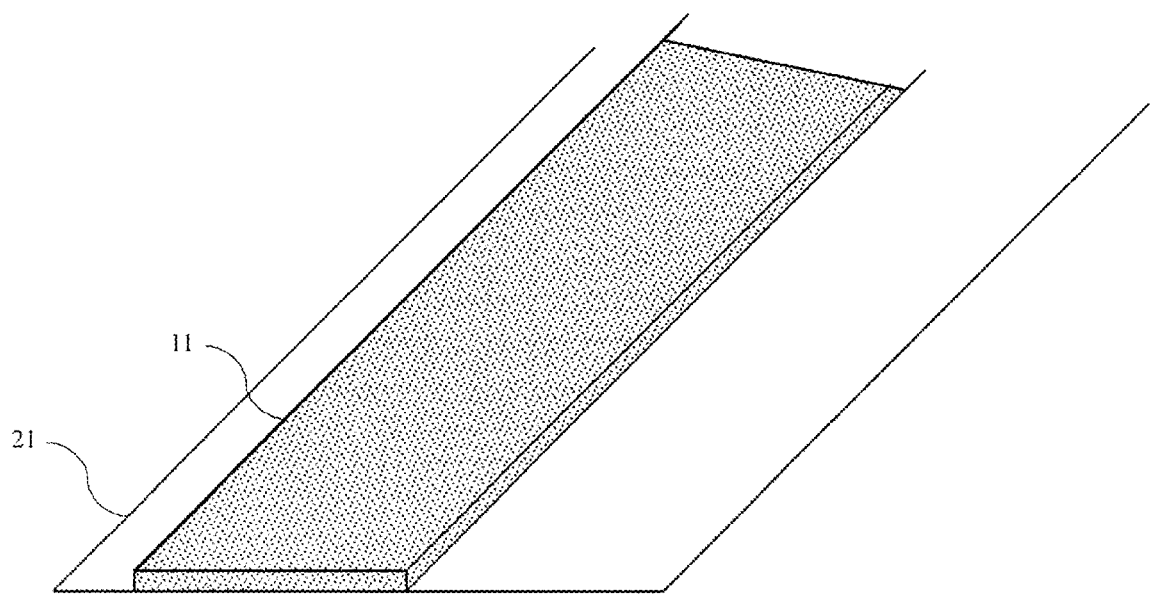
FIG. 1 illustrates a method of laying an optical cable.

Hereinafter, embodiments of the present disclosure will be described in detail with reference to the accompanying drawings. The present disclosure is not limited to the following embodiments. The embodiments are merely examples, and the present disclosure can be implemented in various forms obtained by altering or modifying the embodiments based on the knowledge of those skilled in the art. Components denoted by the same reference numerals in the present specification and the drawings mutually denote the same components.

First Embodiment

Figure 2:
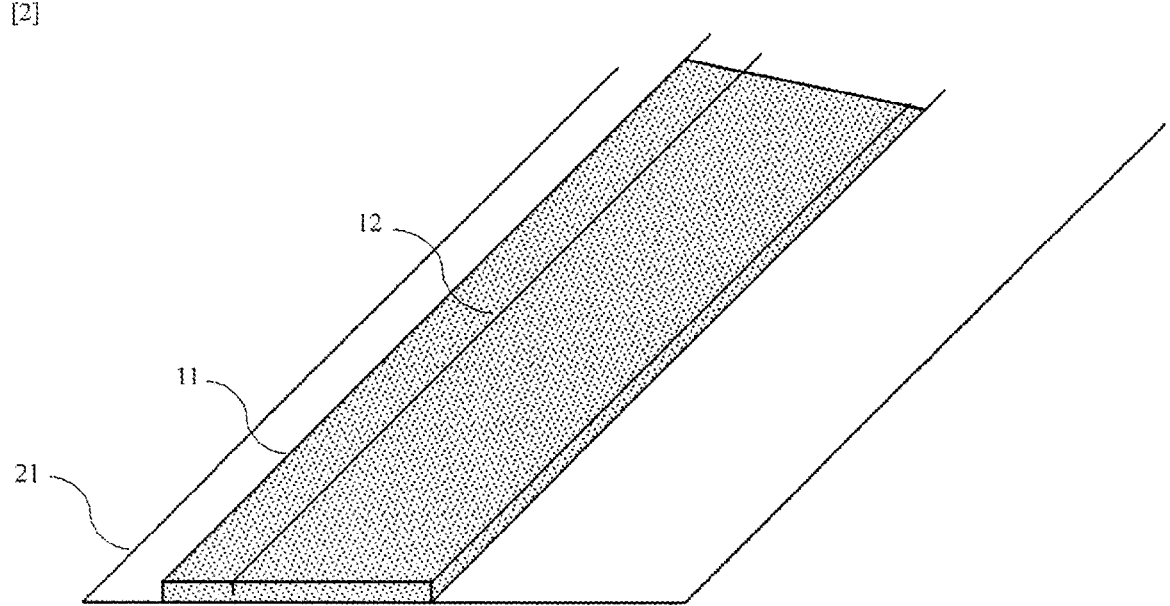
FIG. 2 illustrates the method of laying the optical cable.
Figure 3:
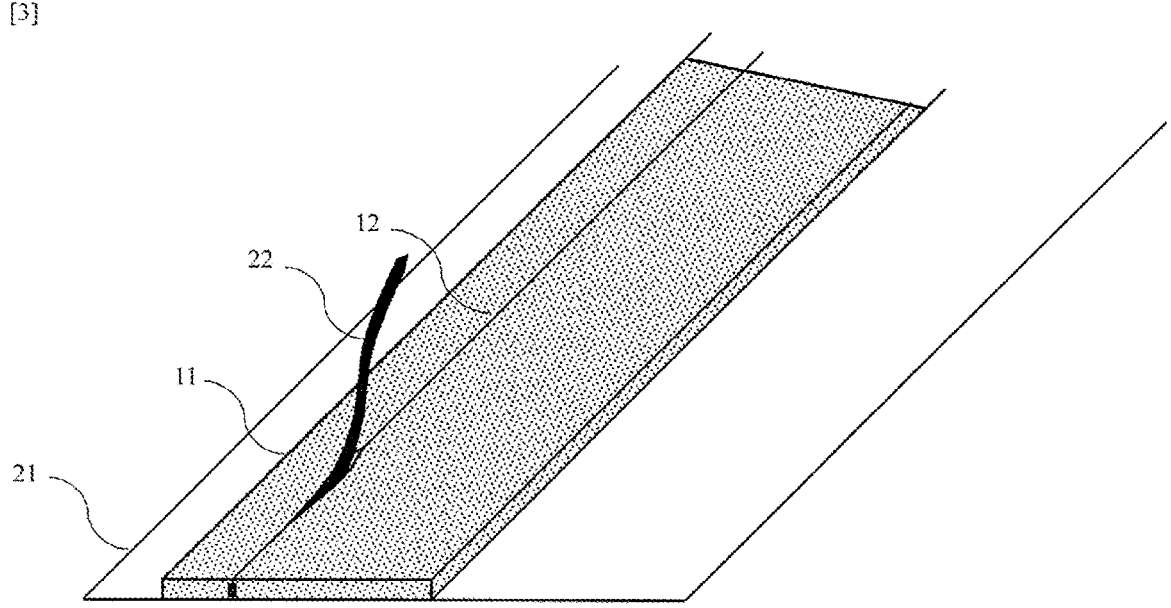
FIG. 3 illustrates the method of laying the optical cable.

An example of a method of laying an optical cable according to the present disclosure will be described with reference to FIGS. 1 to 3. In FIGS. 1 to 3, the reference numeral 11 denotes a laying strip, the reference numeral 12 denotes a cut line, the reference numeral 21 denotes a road surface, and the reference numeral 22 denotes an optical cable.

FIG. 1 illustrates a laying strip 11 installed on a road surface 21. The laying strip 11 is preferably composed of an elastic material such as rubber or resin so that it may smoothly adapt to unevenness of the road surface 21 and absorb vibration from the road surface. When the laying strip 11 is long, roll thereof facilitates transportation to a laying site. When the laying strip 11 is divided into short and tile-like segments, the segments may be stacked for transportation. When the laying strip 11 is installed on the road surface 21, fixing the laying strip 11 to the road surface 21 with an adhesive stabilizes the laying strip 11. Not limited to the installation of the laying strip 11 on the road surface 21 alone, the same applies to installation of a laying strip 11 on a wall surface (not illustrated).

FIG. 2 illustrates the laying strip 11 on which a cut line 12 for embedding an optical cable is formed. A cut in a discretionary shape is made on the upper surface of the laying strip 11 along a discretionary position where the optical cable is to be laid so that a cut line 12 is formed. When there is no obstacle, the cut line 12 may be linearly formed. When a place where a space for accommodating a connection unit of the optical cable, described later, is to be formed is defined, or a place where the space has been already formed is defined, the cut line 12 may be formed in a position and in a shape such that it crosses or detours around the space. As the cut line 12 is formed after the laying strip 11 is installed on the road surface 21 or the wall surface (not illustrated), the cut line 12 having a desired shape can be formed in a desired position according to the environment in which the laying strip 11 is installed.

FIG. 3 illustrates a situation in which an optical cable 22 is embedded in the laying strip 11. The optical cable 22 is embedded in a manner that it is inserted into the cut line 12. The laying strip 11 is preferably composed of an elastic material so that the cut edges of the cut line 12 are closed after the optical cable 22 is embedded.

In the description for FIGS. 1 and 2, the cut line 12 is formed after the laying strip 11 is installed on the road surface 21 or the wall surface, but the laying strip 11 on which the cut line 12 is formed in advance may be installed on the road surface 21 or the wall surface. Forming the cut line 12 in advance, at a site where a tool and an environment are prepared, can facilitate forming the cut line 12.

A new cut line 12 may be additionally formed on the laying strip 11 having the cut line 12 formed thereon. The additional formation of the new cut line 12 allows an optical cable to be additionally laid.

When the optical cable 22 is to be removed, the laying strip 11 may be torn off from the road surface 21 or the wall surface (not illustrated). The laying strip 11 may be torn off after the optical cable 22 is removed, or the laying strip 11 may be torn off with the optical cable 22 embedded.

According to the method of laying the optical cable of the present embodiment, it is possible to provide a method of laying an optical cable that capable of laying and removing the optical cable in a stable place without civil engineering works.

Second Embodiment

An example of a method of laying an optical cable according to the present disclosure will be described with reference to FIGS. 4 to 9. In FIGS. 4 to 9, the reference numeral 11 denotes a laying strip, the reference numeral 12 denotes a cut line, the reference numeral 13 denotes a space, the reference numeral 14 denotes a tray, the reference numeral 15 denotes a lid, the reference numeral 21 denotes a road surface, the reference numeral 22 denotes an optical cable, the reference numeral 23 denotes an optical fiber core wire, and the reference numeral 24 denotes a connection unit.

Figure 4:
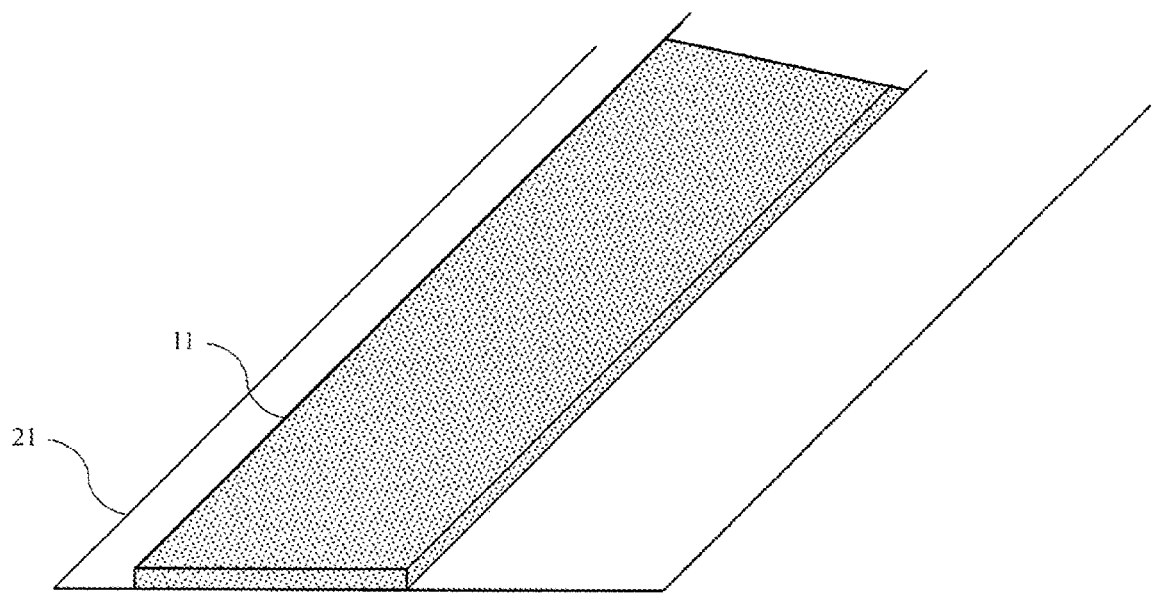
FIG. 4 illustrates a method of laying an optical cable.

FIG. 4 illustrates a laying strip 11 installed on a road surface 21. The configuration and the installation process of the laying strip 11 are the same as those in the first embodiment.

Figure 5:
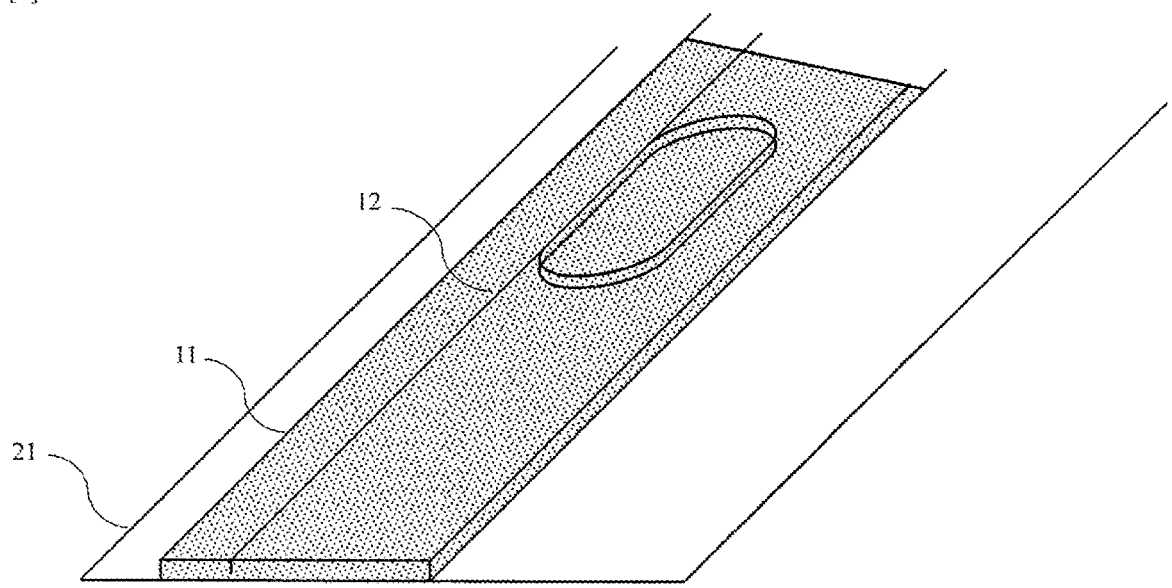
FIG. 5 illustrates the method of laying the optical cable.
Figure 6:
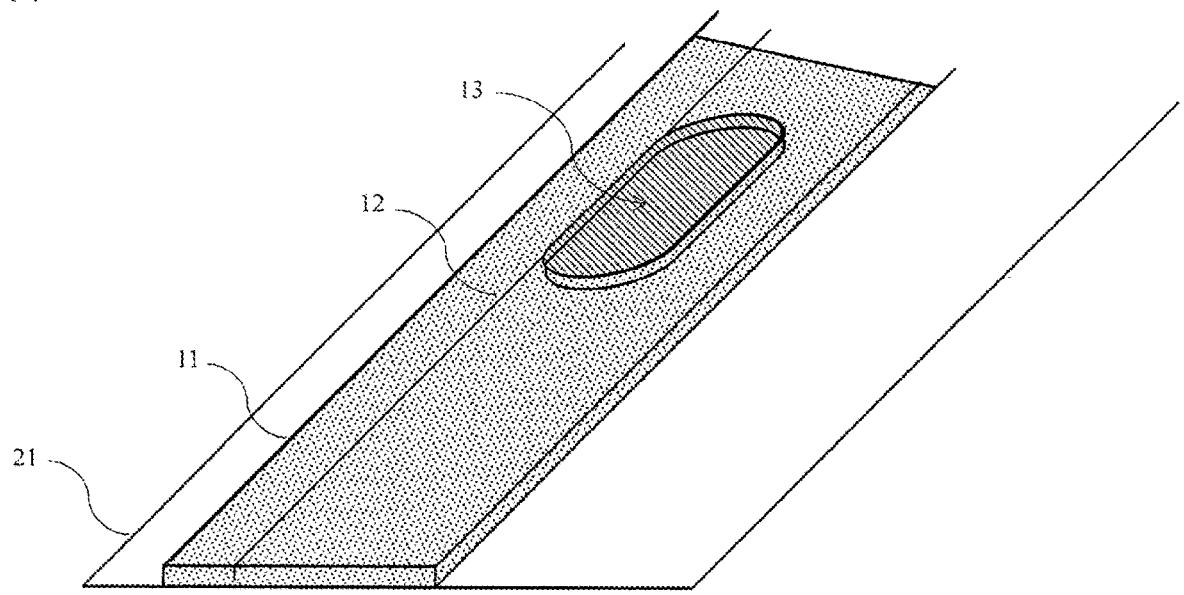
FIG. 6 illustrates the method of laying the optical cable.

FIGS. 5 and 6 illustrate the laying strip 11 on which a cut line 12 for embedding an optical cable is formed and in which a space 13 for accommodating a connection unit of the optical cable is formed. The formation of the cut line 12 is the same as that in the first embodiment. As illustrated in FIG. 5, a cut is made to cut out a part of the laying strip 11, and as illustrated in FIG. 6, the part is then cut out along the cut to form the space 13 for accommodating the connection unit of the optical cable. The space 13 positioned to touch the cut line 12 facilitates accommodating the connection unit of the optical cable. When a plurality of cut lines 12 are formed, the cut lines 12 may be placed with the space 13 interposed therebetween. The cut line 12 may be formed across the space 13. The cut line 12 may be formed to detour around the space 13. As the cut line 12 and the space 13 are formed after the laying strip 11 is installed on the road surface 21 or the wall surface (not illustrated), the cut line 12 and the space 13 having desired shapes can be formed in desired positions according to the environment in which the laying strip 11 is installed.

In the description for FIGS. 4 to 6, the cut line 12 and the space 13 are formed after the laying strip 11 is installed on the road surface 21 or the wall surface, but the laying strip 11 on which only the cut line 12 is formed in advance may be installed on the road surface 21 or the wall surface, and the space 13 may be then formed in the installed laying strip 11. The laying strip 11 in which only the space 13 is formed may be installed on the road surface 21 or the wall surface, and the cut line 12 may be then formed on the installed laying strip 11. The laying strip 11 on which the cut line 12 is formed in advance and in which the space 13 is formed in advance may be installed on the road surface 21 or the wall surface. Forming the cut line 12 and/or the space 13 in advance at a site where a tool and an environment are prepared can facilitate forming the cut line 12 and/or the space 13.

Furthermore, a new cut line 12 may be additionally formed on the laying strip 11 having the cut line 12 formed thereon or the space 13 formed therein, or a new space 13 may be additionally formed in the laying strip 11. The additional formation of the new cut line 12 allows an optical cable to be additionally laid, or the additional formation of the new space 13 allows a connection unit to be additionally accommodated.

Figure 7:
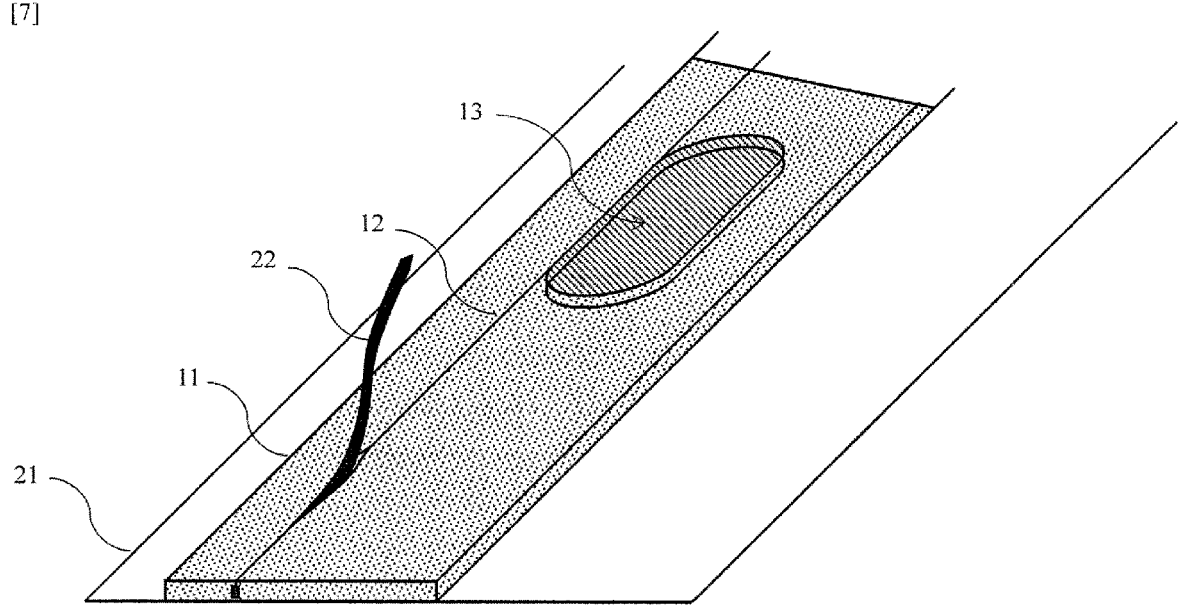
FIG. 7 illustrates the method of laying the optical cable.
Figure 8:
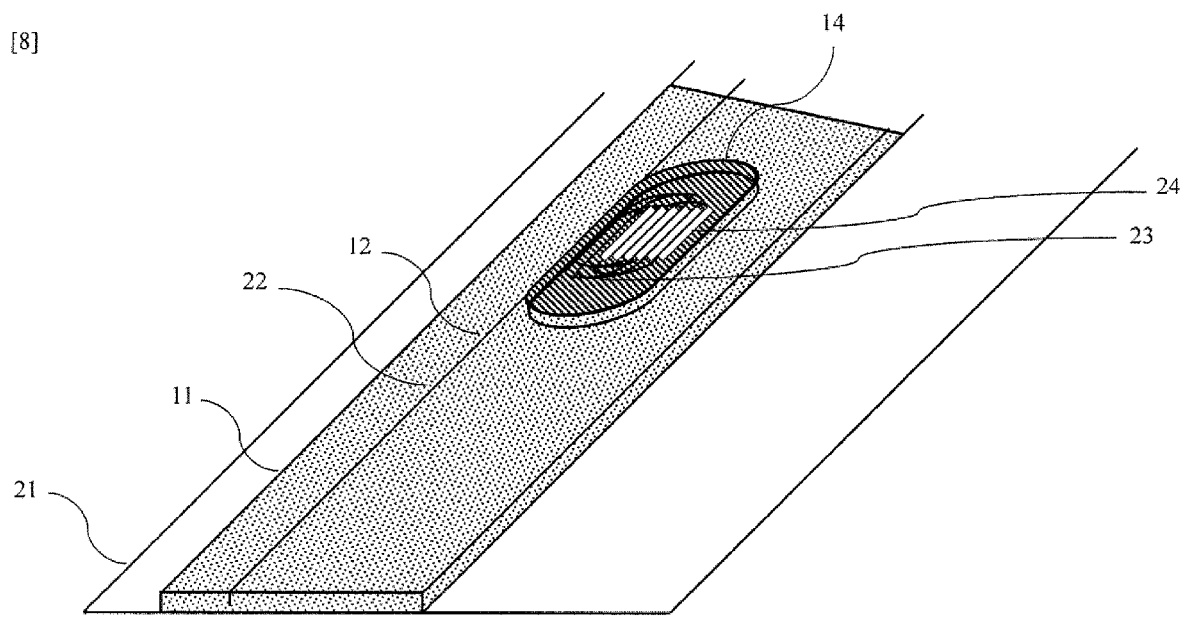
FIG. 8 illustrates the method of laying the optical cable.
Figure 9:
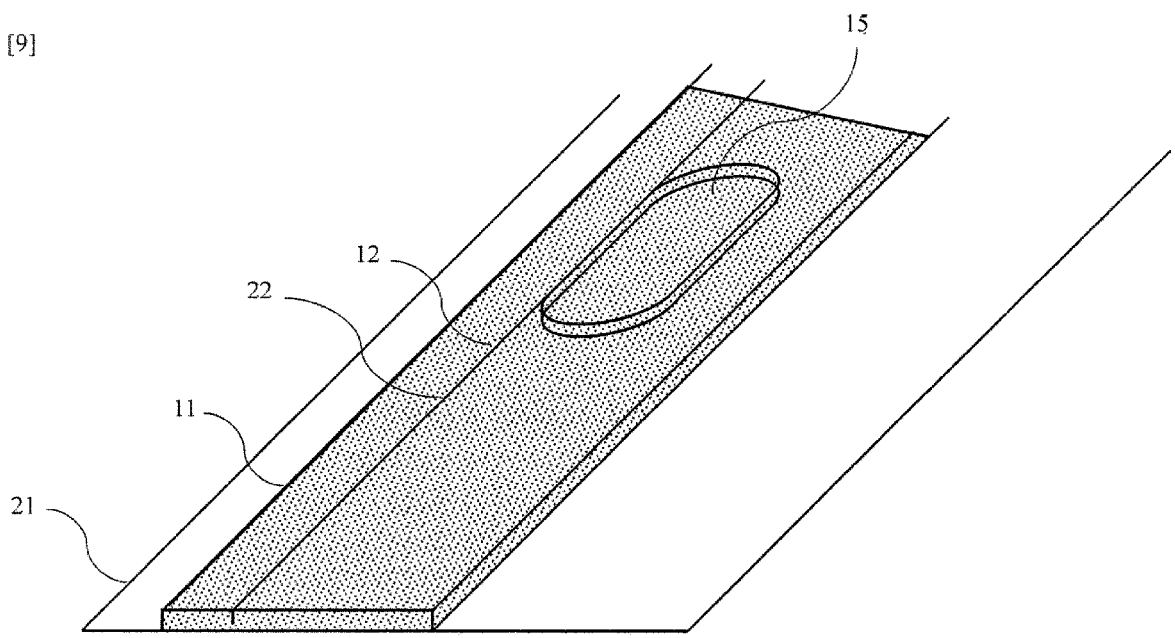
FIG. 9 illustrates the method of laying the optical cable.

FIGS. 7 to 9 illustrate a situation in which an optical cable 22 is embedded in the laying strip 11 and a connection unit 24 is accommodated. As illustrated in FIGS. 7 and 8, a tray 14, in which the connection unit 24 is to be arranged, is provided on a bottom of the formed space 13. The tray 14 is desirably sized and shaped to be contained in the space 13. Before or after the tray 14 is installed, the optical cable 22 is embedded in a manner that it is inserted into the cut line 12.

As illustrated in FIG. 8, when the optical cable 22 is connected or branched, optical fiber core wires 23 are exposed at the end of the optical cable 22 and connected to form the connection unit 24. The extra-length portions of the optical fiber core wires 23 and the connection unit 24 are accommodated in the tray 14. With the tray 14 being provided, the extra-length portions of the optical fiber core wires 23 and the connection unit 24 can be protected. This eliminates the need to separately install a closure or ground box for accommodating the connection unit 24.

The space 13 may be formed after the optical cable 22 is embedded. This enables the connection unit 24 to be arranged in an appropriate position to adapt to the actual length of the optical cable 22, which eliminates the need to adjust the length of the optical cable 22. Accordingly, the waste of cutting the extra-length portion of the optical cable 22 is eliminated, and the trouble is also eliminated in which the optical cable 22 having an insufficient length is replaced with the optical cable 22 having a sufficient length.

As illustrated in FIG. 9, an open side of the space 13 is covered with a lid 15. By being covered with the lid 15, the connection unit 24 and the optical fiber core wire 23 can be protected. The material of the lid 15 is preferably similar to that of the laying strip 11. The shape of the lid 15 is preferably fitted into the open side of the space 13.

When the optical cable 22 is to be removed, the laying strip 11 may be torn off from the road surface 21 or the wall surface (not illustrated). The laying strip 11 may be torn off after the optical cable 22 is removed, or the laying strip 11 may be torn off with the optical cable 22 embedded.

When the laying strip 11 is installed on the road surface according to the above embodiment, components to be used, such as a laying layer, an optical cable, and a tray, can be designed so as not to cause failure due to being trampled or the like, by being constituted of articles such that the laying strip 11 is kept, for example, within about 1 cm in width and having appropriate mechanical properties. As a result, wiring can be economically built which does not get in the way on the road surface and does not obstruct passage similarly to underground wiring or overhead wiring.

According to the method of laying the optical cable of the present embodiment, a method of laying an optical cable can be provided which is capable of laying and removing the optical cable in a stable place without civil engineering works.

INDUSTRIAL APPLICABILITY

The present disclosure can be applied to the information and communication industry.

REFERENCE SIGNS LIST

11 laying strip
12 cut line
13 space
14 tray
15 lid
21 road surface
22 optical cable
23 optical fiber core wire
24 connection unit

The invention claimed is:

1. A method of laying an optical cable, the method comprising:
   installing a laying strip, in which the optical cable is to be embedded, on a road surface or a wall surface;
   after installing the laying strip, forming a cut line in the installed laying strip for embedding the optical cable in the cut laying strip; and
   embedding the optical cable in the formed cut line.

2. The method of laying the optical cable according to claim 1,
   the method further comprising;
   after installing the laying strip, cutting out a part of the laying strip to form a space for accommodating a connection unit of the optical cable,
   providing a tray on a bottom of the space,
   introducing the optical cable into the tray from the cut line, forming the connection unit,
   positioning the connection unit in the tray, and then covering an open side of the space with a lid.

3. The method of laying the optical cable according to claim 1,
   the method further comprising;
   before installing the laying strip, cutting out a part of the laying strip to form a space for accommodating a connection unit of the optical cable,
   after installing the laying strip, providing a tray on a bottom of the space,
   introducing the optical cable into the tray from the cut line,
   forming the connection unit,
   positioning the connection unit in the tray, and then covering an open side of the space with a lid.

4. A method of laying an optical cable, the method comprising:
   forming a cut line in a laying strip for embedding the optical cable in the cut laying strip;
   after forming the cut line, installing the cut laying strip on a road surface or a wall surface; and
   embedding the optical cable in the formed cut line in the installed laying strip.

5. The method of laying the optical cable according to claim 4, the method further comprising;

after installing the laying strip, cutting out a part of the laying strip to form a space for accommodating a connection unit of the optical cable, providing a tray on a bottom of the space, introducing the optical cable into the tray from the cut line, forming the connection unit, positioning the connection unit in the tray, and then covering an open side of the space with a lid.

6. The method of laying the optical cable according to claim 4, the method further comprising;

before installing the laying strip, cutting out a part of the laying strip to form a space for accommodating a connection unit of the optical cable, after installing the laying strip, providing a tray on a bottom of the space, introducing the optical cable into the tray from the cut line, forming the connection unit, positioning the connection unit in the tray, and then covering an open side of the space with a lid.

* * * * *